No. 712,393. Patented Oct. 28, 1902.
L. A. C. LETOMBE.
GAS MOTOR.
(Application filed June 1, 1901.)
(No Model.)

Witnesses:

Inventor.
Léon Abel Celer Letombe.
By his Attorneys.

UNITED STATES PATENT OFFICE.

LÉON ABEL CELER LETOMBE, OF PARIS, FRANCE.

GAS-MOTOR.

SPECIFICATION forming part of Letters Patent No. 712,393, dated October 28, 1902.

Application filed June 1, 1901. Serial No. 62,696. (No model.)

*To all whom it may concern:*

Be it known that I, LÉON ABEL CELER LETOMBE, a citizen of the Republic of France, and a resident of No. 21 Rue de Londres, Paris, in the Republic of France, have invented certain new and useful Improvements in Gas or Explosive Engines, of which the following is a specification.

This invention constitutes an improvement in the mode of regulation of gas-motors described in United States Letters Patent No. 634,063. The system of distribution or regulation described in said patent is based upon the principle of supercompression, which consists, essentially, in reducing the force of the charges admitted when the resistance to be encountered tends to become reduced below its maximum by a supercompression caused by the augmentation of the volume of explosive mixture admitted to the cylinder combined with reduction of the percentage of gas in the said mixture in proportion as the said admissions are increased. The volume of the mixture admitted being larger and the chamber of compression not having changed, the compression at the end of the compression stroke is of course higher, and that constitutes the supercompression, which facilitates the burning of the poorer mixture and increases the efficiency.

In the present invention I retain the principle of supercompression, but provide a different organization of devices for regulating the character and volume of the mixture admitted to the cylinder. A valve under control of a regulator or governor of any suitable type by its variable opening causes automatic suction of the required quantity of gas, which grows proportionally less as the quantity of air increases. I obtain thereby a methodical and continuous regulation of mixture according to variations of load which the motor must overcome by the mere control of the air-valve by the governor.

Figure 1:
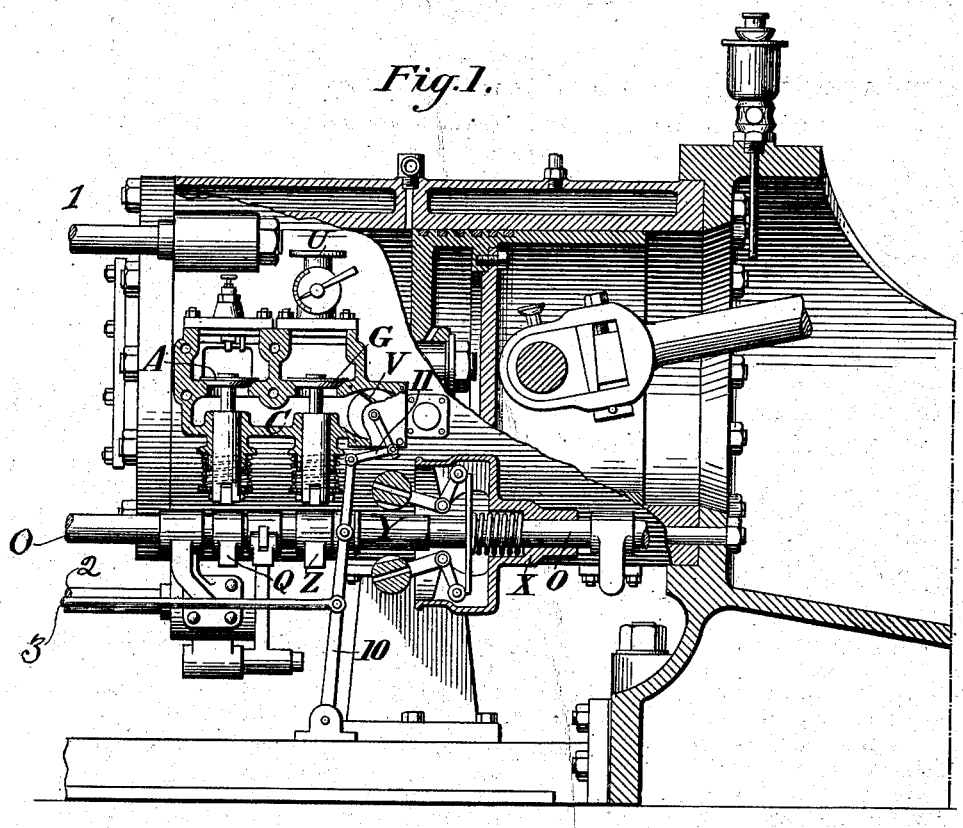
Figure 2:
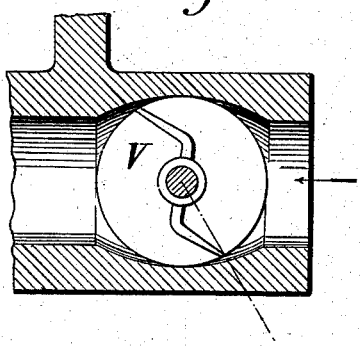
Figure 3:
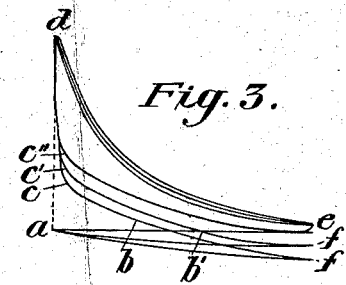

In the accompanying drawings, Figure 1 is a view, partly in side elevation and section, of an engine-cylinder and pertinent associated parts; Fig. 2, a detail view illustrating the air-valve, and Fig. 3 a diagram illustrating the operation of the system of control.

The shaft O, from which the regulator devices may derive their motion, may revolve at half the speed of the main shaft of the engine.

The regulating devices comprise a valve A for admission of the explosive mixture to the cylinder and a valve G for the gas-inlet into the chamber C, which is separated from the cylinder by the valve A.

Admission of air to the chamber C is controlled by a valve V, (shown in detail in Fig. 2,) having its extremities bent so as to produce by its oscillation a change of section nearly proportional to the angle of oscillation. Its position depends upon the action of regulator X, shown as an ordinary ball-governor, which acts on the spindle of the valve through the medium of levers 10 and 11.

The valves A and G may be opened by cams Q and Z on the shaft O at the beginning of the suction-stroke and may each remain open throughout the length of the stroke, although the cam Z should be so arranged as to disengage the valve G a little before the end of the stroke.

When the motor is running at normal speed or with a maximum load, the valve V closes the air-inlet sufficiently so that the depression resulting from the suction will bring the compression curve to intersect the atmospheric line at about the middle of the stroke. It may be seen from the diagram that the suction curve will in this case $(a\,f)$ show a continuous depression and that the compression curve $f\,b\,c\,d$ will intersect the atmospheric line about the middle of the stroke. The complete diagram will be $a\,f\,b\,c\,d\,e\,a$ slightly different from that of Patent No. 634,063.

As long as the motor is running with normal load the area of the air-inlet remains small and the depression which takes place in chamber C sucks in the gas strongly through the valve G. The cocks U are set so that the supply of gas at this moment may give the maximum explosion.

When the power required from the machine diminishes, the regulator X revolves faster and its sleeve Y moves, drawing along the lever 10, which makes valve V turn around, so as to provide for the air a larger inlet-section. The access of the increased volume of air to the chamber C diminishes the depression therein, and consequently a smaller quantity of gas is sucked into the chamber through the valve G. At the same time, the total quantity of the mixture drawn into the chamber C and admitted to the cylinder by valve A being larger than in the first case, the compression will intersect the atmospheric line earlier, so as to obtain such a diagram as $a\ f'\ b'\ c'\ d\ e\ a$.

At the limit when the valve V is quite open compression begins on the atmospheric line at the end of a suction stroke and the diagram $a\ e\ c''\ d\ a$ is obtained.

It may be seen thus that regulation is effected according to the principle of supercompression—that is to say, by increasing the volume of mixture admitted to the cylinder and diminishing the percentage of gas therein as the load on the engine decreases.

The operation is performed with a more perfect continuity than in the organization shown in Patent No. 634,063 and in a simpler way by merely regulating the area of the air-inlet, because the decrease of gas is produced automatically by variations of depression in chamber C.

Racing of the engine on a sudden large reduction in the load is prevented by the sleeve Y of the regulator drawing the cam Z out of engagement with the stem of valve G, which will then remain closed.

The drawings contemplate that an additional cylinder or cylinders is to be arranged in line with the one shown, and hence rods 1 2, that act as braces or tie-rods, are shown extended and broken away. The shaft O is similarly shown and also a rod 3, extending from the lever 10 to actuate a valve V on another cylinder.

I claim as my invention—

1. In an explosive-engine, the combination of the cylinder, a chamber for receiving the explosive mixture, and an admission-valve between them, the gas-inlet, its valve and means for operating it, the air-inlet and its valve so constructed and operated that the area of its opening is increased to supply a larger volume of air when the engine speed increases.

2. In an explosive-engine, a regulating system comprising a gas-inlet, its valve and means for operating it, an air-inlet and its valve so constructed and operated that the area of its opening is increased to supply a larger volume of air when the engine speed increases.

3. In an explosive-engine, a regulating system, comprising means for supplying gas, an air-supply inlet and its valve so constructed and operated that the area of its opening is increased to supply a larger volume of air when the engine speed increases.

In witness whereof I have hereunto set my hand in presence of two witnesses.

LÉON ABEL CELER LETOMBE.

Witnesses:
PAUL HERVÉ,
ANTOINE LAVOIX.